Oct. 17, 1961    J. F. BOYLE ET AL    3,004,737
RETRACTABLE BUOYANT SUPPORTING MEANS FOR VEHICLES
Filed Oct. 25, 1957    2 Sheets-Sheet 1
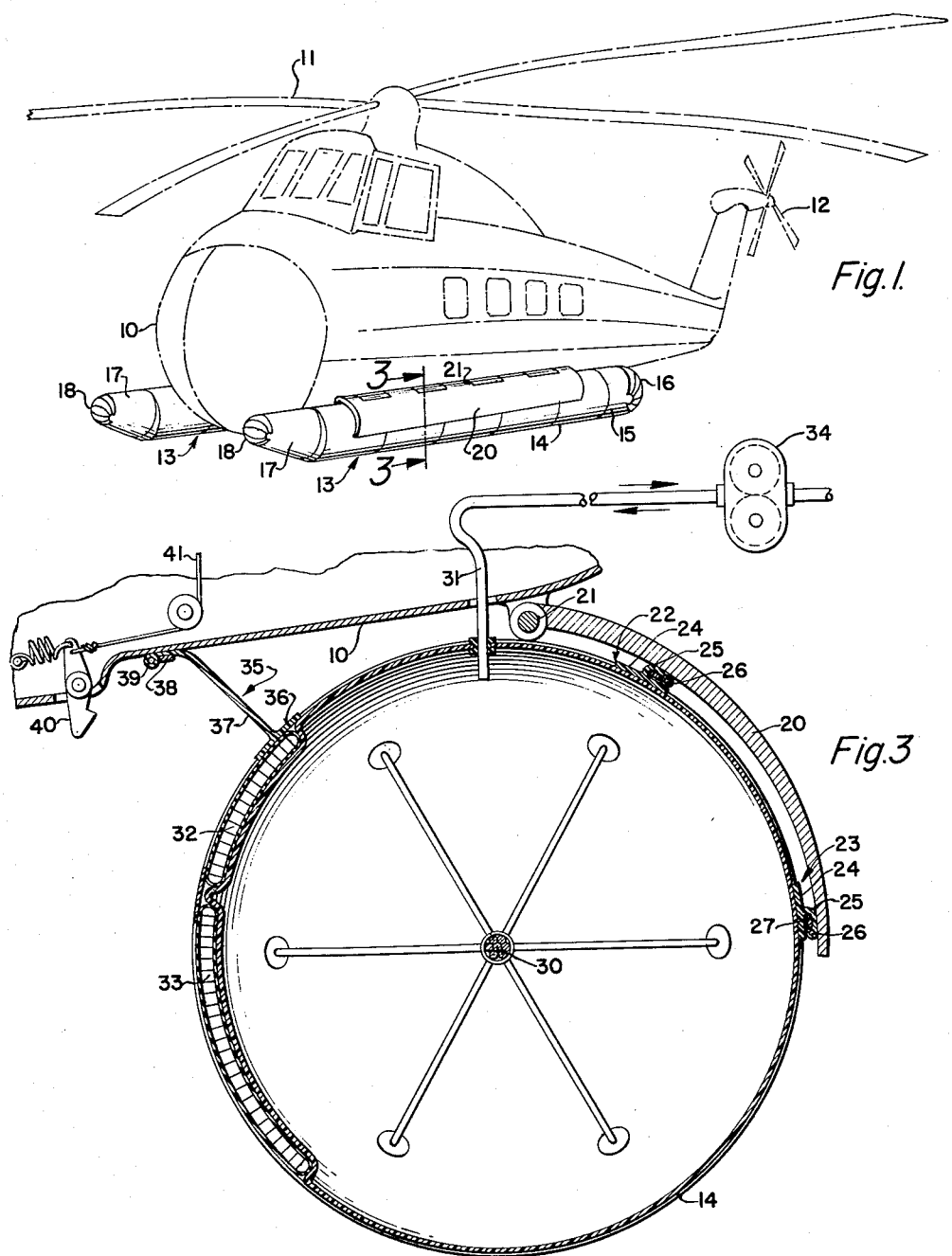
INVENTORS:
JAMES F. BOYLE,
ROBERT J. FRAEBEL,
RAYMOND G. LEHBERGER,
JAMES R. SUMMER,
BY: J. Thomas Eubanks
Attorney.

Oct. 17, 1961 J. F. BOYLE ET AL 3,004,737
RETRACTABLE BUOYANT SUPPORTING MEANS FOR VEHICLES
Filed Oct. 25, 1957 2 Sheets-Sheet 2
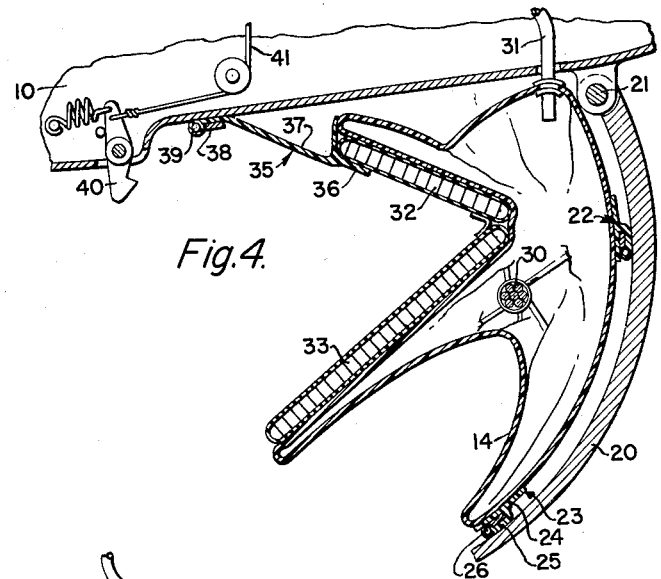
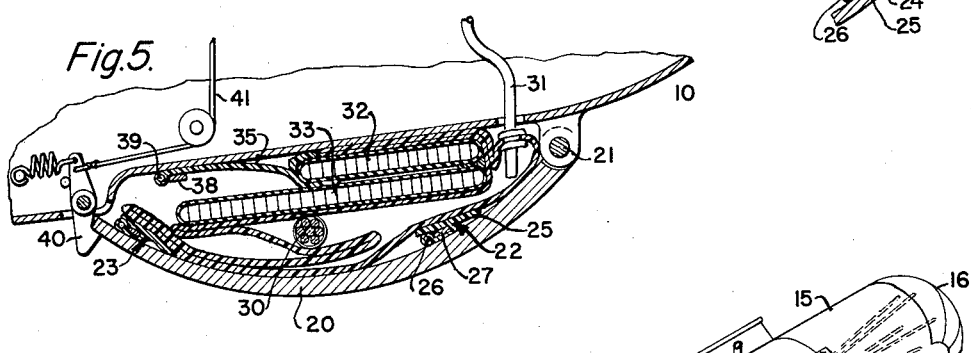
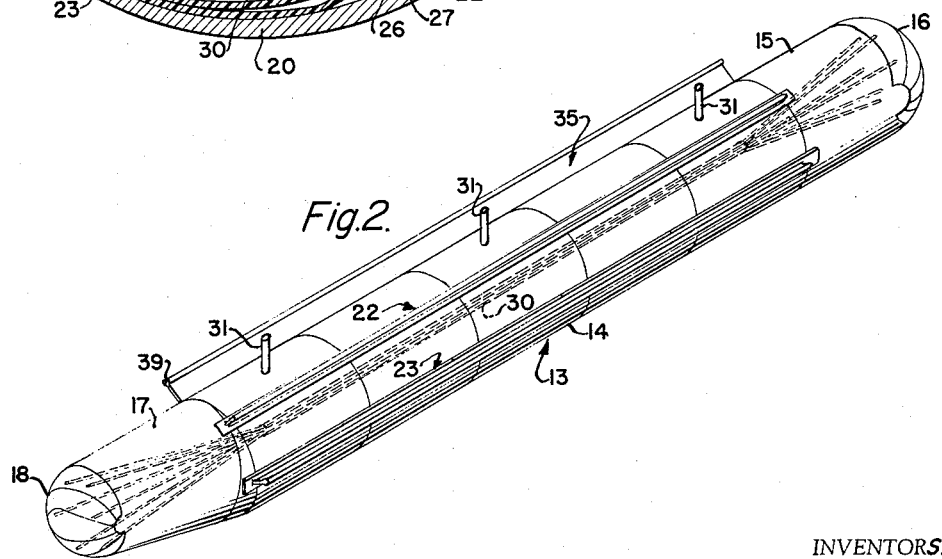
INVENTORS:
JAMES F. BOYLE,
ROBERT J. FRAEBEL,
RAYMOND G. LEHBERGER,
JAMES R. SUMMER,
BY: J. Thomas Eubanks
Attorney.

United States Patent Office 3,004,737
Patented Oct. 17, 1961

3,004,737
RETRACTABLE BUOYANT SUPPORTING
MEANS FOR VEHICLES
James F. Boyle and James R. Summer, Brielle, Robert J. Fraebel, Red Bank, and Raymond G. Lehberger, North Plainfield, N.J., assignors to The Garrett Corporation, Los Angeles, Calif., a corporation of California
Filed Oct. 25, 1957, Ser. No. 692,435
11 Claims. (Cl. 244—102)

This invention relates generally to inflatable means for buoyantly supporting a vehicle on water and more particularly to means adapted to retract and store the inflatable buoyant means in a relatively small space.

While the invention has particular utility in connection with inflatable buoyant supporting means for an airborne vehicle, such as a helicopter, and is hereinafter shown and described as embodied in such an installation, it is to be understood that its utility is not limited thereto, but may be utilized in many other applications, as will be apparent to those skilled in the art.

It is customary for aircraft, such as helicopters which fly over bodies of water, to be equipped with inflatable means capable of buoyantly supporting the aircraft in the event of a landing upon the water. The inflatable means usually comprise a plurality of floats which may be folded and stowed either before takeoff or while the aircraft is in flight to reduce air resistance. Present day aircraft, however, are so heavy, and the inflatable means for supporting the aircraft are necessarily so large, that heretofore proposed means for folding and storing the inflatable buoyancy means are incapable of retracting the buoyancy means out of the air stream sufficiently to prevent excessive aerodynamic drag during flight.

It is therefore an object of the present invention to provide on a vehicle adapted to be supported on water an inflatable buoyant supporting structure having novel means for compactly folding and retracting the inflatable structure during deflation so that it may be stored in a preselected relatively small space and thus reduce aerodynamic drag during flight to a minimum.

It is a further object of the invention to provide on a vehicle adapted to be supported on water an inflatable buoyant supporting structure having means for compactly retracting and folding the inflatable structure during deflation which are simple and inexpensive in construction and effective in operation.

Other and further objects of the present invention will become apparent from the disclosures in the following detailed specification, appended claims, and accompanying drawings, wherein:

FIG. 1 is a perspective view of a helicopter, with a pair of inflatable buoyant floats embodying the invention in its preferred form, shown fully inflated;

FIG. 2 is an isometric view of one of the buoyant floats of FIG. 1 shown fully inflated, the door or cover being omitted for clarity;

FIG. 3 is a cross-section of one of the buoyant floats shown in FIG. 1, taken on line 3—3 thereof;

FIG. 4 is a sectional view showing the buoyant float of FIG. 3 in the partially retracted position; and FIG. 5 is a sectional view showing the buoyant float of FIG. 3 in the fully retracted or stowed position.

Referring to the drawings, there is shown in FIG. 1 an aircraft, such as a helicopter, having a body 10, a lift rotor 11, a directional control tail propeller 12, and a plurality of inflatable buoyant supporting structures or floats indicated generally at 13. The floats 13 may, as shown in FIG. 1, serve as the primary means for buoyantly supporting an airborne vehicle on water. It is to be understood, however, that floats such as shown in FIG. 1 may be used as buoyant means on any type of vehicle intended to be supported on water, or may be used on an air-borne vehicle to cushion and/or support the vehicle when it alights on land.

As shown in greater detail in FIG. 2, each of the floats 13 comprises a substantially cylindrical central section or chamber 14, a rear end section 15, similar in cross-section to the central chamber 14 and having an end closure wall 16 which may be hemispherical in shape, and a front end section 17 that tapers on the bottom and two sides from the central chamber 14 to an end closure wall 18 that may also be hemispherical in shape. The floats, which may be constructed of suitably shaped pieces of impervious flexible material, such as rubber or fabric, secured to one another in any manner well known in the art, are supported on the vehicle by means to be described hereinafter in detail.

As shown in FIGS. 3, 4 and 5, a cover or door 20 is connected to the body 10 of the helicopter by a hinge 21. The inner surface of the door 20 conforms generally to the contour of the surface of the central chamber 14 of the float when fully inflated. The central chamber 14, or a portion thereof, may be directly connected or cemented to the inner surface of the door 20 or may be attached to the door in the manner hereinafter described by means of longitudinal girts shown generally at 22 and 23.

The girts 22 and 23 may be made of rubber or fabric and each have a base portion 24 secured by any manner well known in the art to the outer surface of the central chamber 14. Extending from the base portion 24 is a flange member 25 having a cord, wire or other similar element 26 secured to its outer end. When the float 13 is attached to the door 20 the flanges 25 of the girts 22 and 23 are bent over as shown in FIG. 4 and held against the inner surface of the door by a strap 27 which is secured to the door and the flange in any manner well known in the art. The cord 26 serves to prevent the flange member 25 from slipping back under the strap 27. It is to be noted that, while the central chamber 14 of the float is secured to the door 20, the rear end section 15 and the front end section 17 are free to extend and contract.

An elastic means, such as an exerciser or bungee cord 30 having a number of strands which spread out at each end, is positioned within the float 13 and is attached at its ends to the end closure walls 16 and 18 of the float. A combination blower and exhauster, such as a pump 34, is connected to the floats by conduits 31 for inflating and exhausting the floats. The pump may be driven from the shaft of the rotor 11 or by other means well known in the art.

When the float is fully inflated, the front end section 17 and the rear end section 15 will be extended as shown in FIGS. 1 and 2 and the exerciser cord 30 will be extended and stressed. As the air is exhausted from the float the exerciser cord will progressively pull and retract the front end section 17 and the rear end section 15 into the central chamber 14.

To facilitate proper folding of the float and nesting within a preselected relatively small space, such as a recess or cavity in the body 10 of the helicopter, the floats are provided with reinforced portions 32 and 33, the portions being formed of a material capable of assuming the substantially circumferential shape shown in FIG. 3 when the float is fully inflated and having sufficient rigidity or stiffness to straighten and assume the shape shown in FIGS. 4 and 5 when the float is partially or fully deflated. The portions 32 and 33, for example, may be a strip of two-ply, air tight, inflatable, mattress fabric wherein the inner and outer plies are interconnected by a multiplicity of tie threads of predetermined length, or may be formed of other suitable material having the desired stiffness characteristics. The portions 32 and 33 are provided with inflation valves (not shown) so that they may be inflated separately from the float to sufficient pressure to obtain the above characteristics, and then may remain inflated at all times, even when the float is stowed.

A girt, shown generally at 35, is secured to the central chamber 14 of the float adjacent the end of the reinforced portion 32 distant from the reinforced portion 33 by a base portion 36. A flange member 37 extending from the base portion 36 is bent over as shown in FIGS. 3 and 4 and held against the outer surface of the body 10 of the helicopter by a strap 38 which is secured to the helicopter and the flange in any manner well known in the art. A cord 39 secured to the outer end of the flange member 37 serves to prevent the flange member from slipping back under the strap 38.

When the front end section 17 and the rear end section 15 have been pulled or retracted into the central chamber 14 as described above, and the air is further exhausted from the float, the lower pressure created within the float will cause it to fold. When the float commences to fold, the portion of the float attached to the base portion 36 of the girt 35 is restrained by the girt and the relatively stiff reinforced portions 32 and 33 of the float fold toward each other as shown in FIG. 4. As the float folds, the door 20 is pulled inwardly and upwardly. When the float is fully deflated, it is compactly folded or nested within the preselected relatively small space as shown in FIG. 5, and the door engages a spring loaded latch 40 to retain it in place.

When it is again desired to utilize the float, air is supplied to it and the latch 40 is released in any manner well known in the art, such as a manual pull on a cable 41. As the pressure within the float increases, it unfolds the float and forces the door 20 downwardly and outwardly. When the float is substantially unfolded, and air continues to be supplied thereto, the front end section 17 and the rear end section 15 are forced outwardly against the force of the exerciser cord 30 until the float is fully inflated, as shown in FIGS. 1 and 2.

Thus it will be appreciated that the structure of the present invention provides a float that can be stored in a space of relatively small volume when deflated, but expands and extends, when inflated, to afford a large and adequately buoyant volume; and that the aforesaid features and advantages are obtained by the present invention through the embodiment of relatively simple and inexpensive elements.

Certain modifications may be made on the float, all coming within the true scope of the invention. For example, the interior of the float may be provided with a plurality of longitudinal partitions (not shown) to form separate and independent fluid chambers each supplied with air from a single source or separate sources.

It is furthermore to be noted that although the preselected space for storing the floats is shown and described as being exterior of the body of a helicopter, the floats could just as easily be stored in compartments provided within the vehicle. In this event, the outer surface of the door 20 may be formed to conform generally to the contour of the body of the helicopter at the compartment to further reduce aerodynamic drag when the door is closed.

We claim:

1. In a vehicle adapted to be supported on water; an inflatable buoyant supporting structure comprising a central section and inflatable, flexible auxiliary end sections communicating with the central section and extending longitudinally beyond the ends thereof when inflated; means for attaching said inflatable buoyant supporting structure to said vehicle; means for supplying fluid to, and exhausting fluid from, said inflatable buoyant supporting structure; and longitudinally extending expansible means connected to said end section and extending longitudinally of said central section for retracting each of said end sections into said central section when said inflatable buoyant supporting structure is deflated.

2. In a vehicle adapted to be supported on water; an inflatable buoyant supporting structure comprising a flexible central section and inflatable, flexible auxiliary end sections in open communication with the central section and extending longitudinally beyond the ends thereof when inflated; means for attaching said inflatable buoyant supporting structure to said vehicle; means for supplying fluid to, and exhausting fluid from, said inflatable buoyant supporting structure; and longitudinally extending expansible means connected to each of said end sections and extending longitudinally of said central section for retracting each of said end sections into said central section when said inflatable buoyant supporting structure is deflated.

3. In a vehicle adapted to be supported on water; an inflatable buoyant supporting structure comprising a generally elongated flexible member having a central section and inflatable, flexible auxiliary end sections which project longitudinally beyond the ends of the central section when inflated; means for attaching said inflatable buoyant supporting structure to said vehicle; means for supplying fluid to, and exhausting fluid from, said inflatable buoyant supporting structure; and means comprising one or more elastic members connecting each of said end sections and disposed to be tensioned when the supporting structure is inflated for retracting each of said end sections into said central section when said inflatable buoyant supporting structure is deflated.

4. In a vehicle adapted to be supported on water; a rigid member hingedly attached to said vehicle; an inflatable buoyant supporting structure comprising an elongated flexible central chamber attached to said rigid member and inflatable, flexible fluid retaining end chambers in open communication with said central chamber and arranged to extend longitudinally beyond the ends thereof when inflated; means for supplying fluid to, and exhausting fluid from, said inflatable buoyant supporting structure; and elastic means connected to each of said end chambers and arranged to be tensioned when the supporting structure is inflated for retracting said end chambers into said central chamber when said inflatable buoyant supporting structure is deflated.

5. In a vehicle adapted to be supported on water; a rigid member hingedly attached to said vehicle; an inflatable buoyant supporting structure comprising an elongated central chamber attached to said member and inflatable, flexible fluid retaining end chambers in open communication with said central chamber and arranged to extend longitudinally beyond the ends thereof when inflated; means for supplying fluid to, and exhausting fluid from, said inflatable buoyant supporting structure; means comprising one or more elastic members connecting each of said end chambers and disposed to be tensioned when the supporting structure is inflated for retracting each of said end chambers into said central chamber when said inflatable buoyant supporting structure is partially deflated; and means associated with said inflatable buoyant supporting structure for folding the buoyant supporting structure into compactly nested condition when said end chambers are retracted into said central chamber and said inflatable buoyant supporting structure is further deflated.

6. In a vehicle having a cavity portion in a wall thereof and adapted to be supported on water; a cover for said cavity operatively attached to the body of said vehicle; an inflatable buoyant supporting structure comprising an elongated central chamber attached to said cover and inflatable, flexible fluid retaining end chambers in open communication with said central chamber and arranged to extend longitudinally beyond the ends thereof when inflated; means for supplying fluid to, and exhausting fluid from, said inflatable buoyant supporting structure; means comprising one or more elastic members connecting each of said end chambers and disposed to be tensioned when the supporting structure is inflated for retracting each of said end chambers into said central chamber when said inflatable buoyant supporting structure is partially deflated; and means associated with said inflatable buoyant supporting structure for folding the buoyant supporting structure into compactly nested condition within said cavity when said end chambers are retracted into said central chamber and said inflatable buoyant supporting structure is further deflated.

7. In a vehicle having a cavity portion in a wall thereof and adapted to be supported on water; a cover for said cavity operatively attached to the body of said vehicle; an inflatable buoyant supporting structure comprising an elongated central chamber attached to said cover and inflatable, flexible fluid retaining end chambers in open communication with said central chamber and arranged to extend longitudinally beyond the ends thereof when inflated; means for supplying fluid to, and exhausting fluid from, said inflatable buoyant supporting structure; means comprising one or more elastic members connecting each of said end chambers and disposed to be tensioned when the supporting structure is inflated for retracting each of said end chambers into said central chamber when said inflatable buoyant supporting structure is partially deflated; and means including stiffener members attached to the wall of the central chamber of said inflatable buoyant supporting structure for folding the buoyant supporting structure into compactly nested condition within said cavity portion when said end chambers are retracted into said central chamber and said inflatable buoyant supporting structure is further deflated.

8. In a vehicle having a cavity portion in a wall thereof and adapted to be supported on water; a cover for said cavity operatively attached to the body of said vehicle; an inflatable buoyant supporting structure comprising an elongated central chamber attached to said cover and inflatable, flexible fluid retaining end chambers in open communication with said central chamber and arranged to extend beyond the ends thereof when inflated; means for supplying fluid to, and exhausting fluid from, said inflatable buoyant supporting structure; means comprising one or more elastic members connecting each of said end chambers and disposed to be tensioned when the supporting structure is inflated for retracting each of said end chambers into said central chamber when said inflatable buoyant supporting structure is partially deflated; and means including stiffener members attached to the wall of the central chamber of said inflatable buoyant supporting structure and a restraining member interconnecting said inflatable buoyant supporting structure and the body of said vehicle for folding the buoyant supporting structure into compactly nested condition within said cavity portion when said end chambers are retracted into said central chamber and said inflatable buoyant supporting structure is further deflated.

9. A container for a fluid, comprising: a fluid retaining central chamber; inflatable, flexible fluid retaining end chambers connected to said central chamber and adapted to extend longitudinally beyond the ends thereof when inflated; means for supplying fluid to, and exhausting fluid from, said container; and elastic means connected to each of said end chambers and disposed longitudinally of said central section to retract each of said end chambers into said central chamber when pressure within the container approximates ambient pressure and to permit said end chambers to extend out of said central chamber when the pressure within the container rises above ambient pressure.

10. A container for a fluid, comprising: a fluid retaining central chamber; inflatable, flexible fluid retaining end chambers in open communication with said central chamber and adapted to extend longitudinally beyond the ends thereof when inflated; means for supplying fluid to, and exhausting fluid from, said container; and elastic means interconnecting each of said end chambers and disposed to retract each of said end chambers into said central chamber when pressure within the container approximates ambient pressure and to permit said end chambers to extend out of said central chamber when the pressure within the container rises above ambient pressure.

11. A container for a fluid, comprising: a generally elongated fluid retaining central chamber; inflatable, flexible fluid retaining end chambers in open communication with said central chamber, said end chambers being adapted to extend longitudinally beyond the ends of the central chamber when inflated; means for supplying fluid to, and exhausting fluid from, said container; and means comprising one or more elastic members arranged longitudinally within said central chamber and connected to each of said end chambers and disposed to retract each of said end chambers into said central chamber when pressure within the container approximates ambient pressure and to permit said end chambers to extend out of said central chamber when the pressure within the container rises above ambient pressure.

References Cited in the file of this patent

UNITED STATES PATENTS

| | | |
|---|---|---|
| 2,306,269 | King | Dec. 22, 1942 |
| 2,463,351 | Bowers | Oct. 23, 1947 |
| 2,795,257 | Cunningham | Aug. 5, 1955 |